United States Patent [19]

Hamann et al.

[11] 3,721,956

[45] March 20, 1973

[54] THEFT ALARM OPERABLE BY VIBRATION

[76] Inventors: Victoria Hamann, 1032 El Camino Real, Belmont 94002; Jack C. Dawson, 2206 Darmelita Drive, San Carlos 94070, both of Calif.

[22] Filed: Feb. 8, 1971

[21] Appl. No.: 113,409

[52] U.S. Cl. ............... 340/65, 200/61.49, 340/261
[51] Int. Cl. ........................................... B60r 25/10
[58] Field of Search. 340/65, 261; 200/61.52, DIG. 8, 200/61.49

[56] References Cited

UNITED STATES PATENTS

| 3,559,203 | 1/1971 | Hall et al. | 340/261 |
| 3,336,530 | 8/1967 | Sloan et al. | 340/261 |
| 2,724,823 | 11/1955 | Toepfer | 340/261 |
| 3,160,868 | 12/1964 | Kowanda | 340/65 |

Primary Examiner—John W. Caldwell
Assistant Examiner—Glen R. Swann, III
Attorney—Julian Caplan and Gregg, Hendricson & Caplan

[57] ABSTRACT

An alarm is attached to a device such as a bicycle and operates when the device is moved. The alarm is controlled by a key switch which is turned on when the device is left unattended and must be turned off to de-energize the alarm. Within a casing is a vibration switch consisting of a weight on a flexible wire contained within a tube. Vibration and/or displacement from rest position causes the weight to establish momentary electric contact with the tube. The electric circuit contains a latching element such as a silicon controlled rectifier, the gate of which is connected to the vibration switch. With the key switch on, moving the device causes the weight to contact the tube, latching the rectifier on, and causing the buzzer to sound until the key switch is turned off.

1 Claim, 4 Drawing Figures

PATENTED MAR 20 1973　　3,721,956
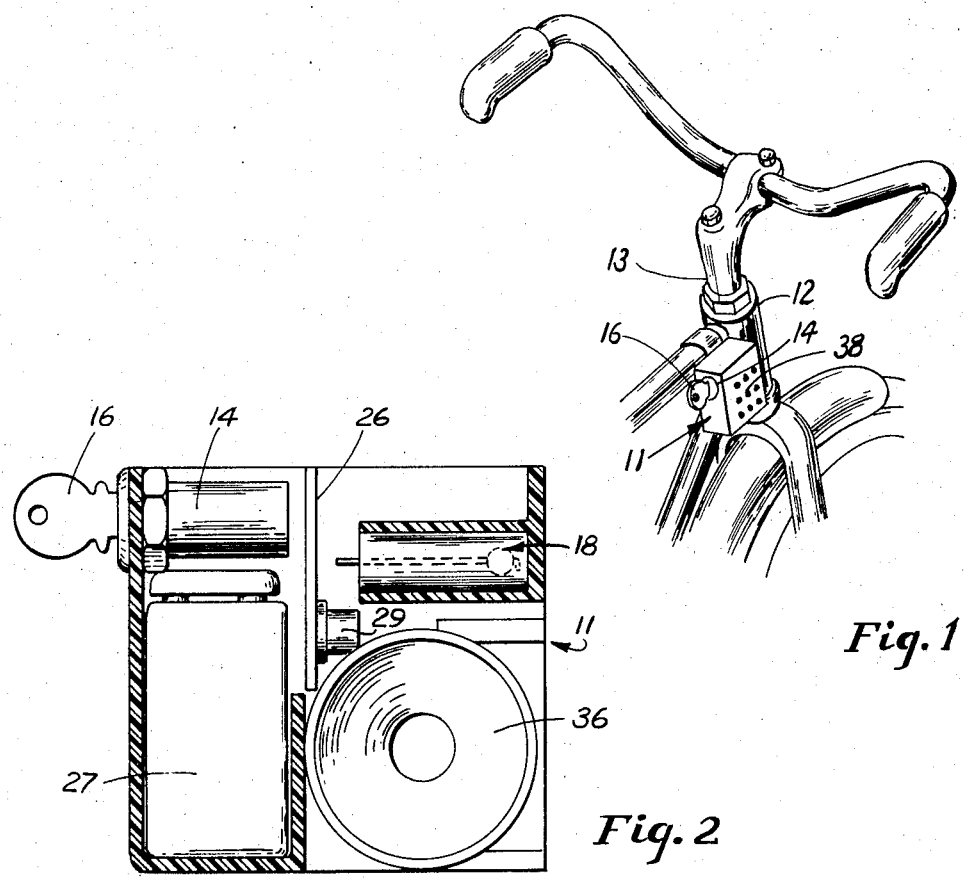
Fig. 1
Fig. 2
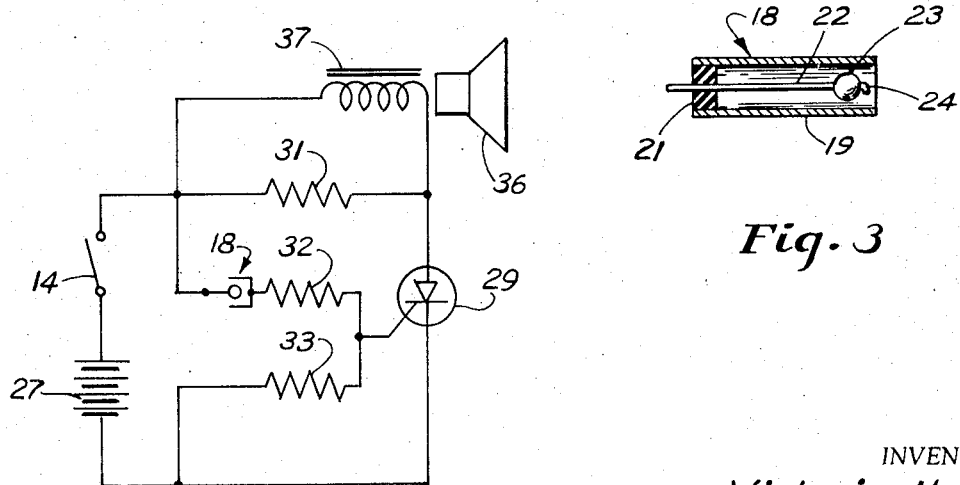
Fig. 3
Fig. 4
INVENTOR.
Victoria Hamann
Jack C. Dawson
BY Julian Caplan
Attorney

THEFT ALARM OPERABLE BY VIBRATION

SUMMARY OF THE INVENTION

This invention relates to a new and improved theft alarm operable by vibration and/or spatial displacement of the device to which it is attached. A typical installation is on a bicycle which is left unattended. If the bicycle is moved, the vibration of the movement causes the alarm to sound and the alarm continues to sound until the electric circuit is broken by turning a key switch off.

A feature of the invention is the fact that the movement of the device to which the alarm is attached in any plane causes the alarm to sound, whereas other alarms which have relied upon movement of the vehicle to energize the alarm circuit required movement in a specific plane.

Another feature of the invention is the fact that only a very small movement is necessary in order to cause the alarm to sound.

As a still further feature of the invention, the vibratory switch which causes the circuit to close may be adjusted in sensitivity so that only vibrations above a certain amplitude cause the buzzer to sound.

Another feature of the invention is the fact that the unit is self-contained in that it is battery-operated and the entire circuit, including circuit components, buzzer and battery are enclosed in a case which may be mounted on the device in a manner so that the alarm cannot be removed. The casing may be attached to any portion of the device such as the steering post or handlebar of a bicycle where the key switch is readily accessible.

Another feature of the invention is the fact that it is necessary to turn a key in order to inactivate the circuit. The vibratory movement causes the buzzer to sound continuously until the key is turned.

Other objects of the present invention will become apparent upon reading the following specification and referring to the accompanying drawings in which similar characters of reference represent corresponding parts in each of the several views.

DESCRIPTION OF THE DRAWINGS

In the drawings:

FIG. 1 is a fragmentary, perspective view of a portion of a bicycle with the alarm attached thereto.

FIG. 2 is an enlarged sectional view through the alarm.

FIG. 3 is a sectional view through the vibratory switch.

FIG. 4 is a circuit diagram of the device.

DESCRIPTION OF THE PREFERRED EMBODIMENT

Casing 11 of the present invention may be affixed to any device to be protected. In the accompanying FIG. 1, the casing 11 is fixed permanently (by means forming no part of the present invention) to the steering post 12 of a bicycle 13. It will be understood that the alarm may be attached to various other devices and in any desired location. The means of attachment of the casing 11 to the post 12 is not illustrated in detail, but it will be understood that a permanent attachment means is preferred.

All of the circuitry and components of the alarm are contained within the casing 11. Thus, a key operated switch 14 is accessible from the exterior so that the key 16 thereof may be inserted. The location of casing 11 on post 12 insures that it is convenient for the owner to insert and withdraw the key 16. When switch 14 is off, the cover of the casing 11 may be removed to provide access to change batteries. Within the casing 11 is a vibratory switch 18 which is sensitive to movement in any plane. When the switch 14 is on, vibration closes the switch 18 and energizes the circuit as hereinafter appears. Switch 18 consists of a conductive tube 19 which is closed at one end by a fiber washer 21. A flexible stem 22 is inserted through the central hole in washer 21 with a sliding fit. Stem 22 is preferably formed of a material such as piano wire. At the outer end of wire 22 is a weight 23 such as a split lead shot fixed to the wire 22. To insure against displacement of the shot 23, a bend 24 is formed in the outer end of wire 22. By moving the wire relative to washer 21 the sensitivity of the switch 18 may be adjusted because the distance between weight 23 and washer 21 affects the amplitude wire 22 flexes for any given vibration. Once adjusted, the wire is fixed in place and further adjustment is generally unnecessary.

Oscillation of shot 23 under vibration of switch 18 causes ball 23 momentarily to contact tube 19, establishing an electrical connection which causes the circuit for the buzzer to sound as hereinafter explained.

The electrical components are preferably mounted upon a printed circuit board 26 which fits into the casing 11. An electric battery 27 which is preferably of a small size but of sufficient voltage and power to energize the buzzer circuit is installed in a compartment in casing 11 and is preferably accessible for changing exhausted batteries when the key switch 14 is open. Mounted on the circuit board is a silicon controlled rectifier 29. Switch 18 is connected in series with a resistor 32 to the gate of rectifier 29. The function of the rectifier 29 is that when there is a momentary closing of the switch 18, the gate voltage triggers the rectifier to "On" state and the circuit is latched closed until the switch 14 is opened. The energization of the circuit causes sounding of a buzzer 36 the coil 37 of which is wired into the circuit. The values of the resistors 31, 32 and 33, in a preferred embodiment of the invention, are 100, 5,600 and 1,000 ohms, respectively, and the rectifier 29 is a Motorola No. 2N5060. It will be understood that the value of the components is subject to considerable variation.

In use, the owner closes the switch 14 when he leaves the device 13 unattended. If there is any vibration of the casing 11 in any plane, switch 18 is momentarily closed, energizing the gate of the rectifier and latching the circuit closed. Closing of the circuit energizes the coil 37 of buzzer 36 and causes the buzzer to sound continuously until the switch 14 is opened, whereupon the rectifier 29 is unlatched.

What is claimed is:

1. An alarm responsive to vibration comprising a casing having means for attachment to a device to be guarded and containing the other components of said alarm, said components comprising a key-operated switch having a first and second switch terminal, a battery having a first battery terminal connected to said first switch terminal and a second battery terminal, a latching silicon controlled rectifier having a cathode, an anode and a gate electrode, a buzzer having a coil, said coil connected between said second switch terminal and said anode, a first resistor across said coil, said cathode connected to said second battery terminal, a second switch comprising a conductive tube and a straight flexible conductive wire, means mounting said wire axially of said tube, a conductive weight on said wire normally centered within said tube when said device is at rest, a non-conductive washer having a central aperture in one end of said tube, said wire fixed in said aperture, said weight vibrating to establish electric contact with said tube when said device is moved, said flexible wire connected to said second switch terminal, a second resistor connected in series with said tube and said electrode gate, a third resistor connected to said gate and said second battery terminal, said third resistor being substantially less than the resistance of said second resistor, said rectifier being energized when said weight contacts said tube by vibration of said device to conduct the current through said coil from said battery continuing to flow until said key operated switch is opened.

* * * * *